No. 894,000. PATENTED JULY 21, 1908.
L. B. HART & C. I. DUPONT.
VEHICLE RUNNING GEAR.
APPLICATION FILED OCT. 10, 1907.
2 SHEETS—SHEET 1.
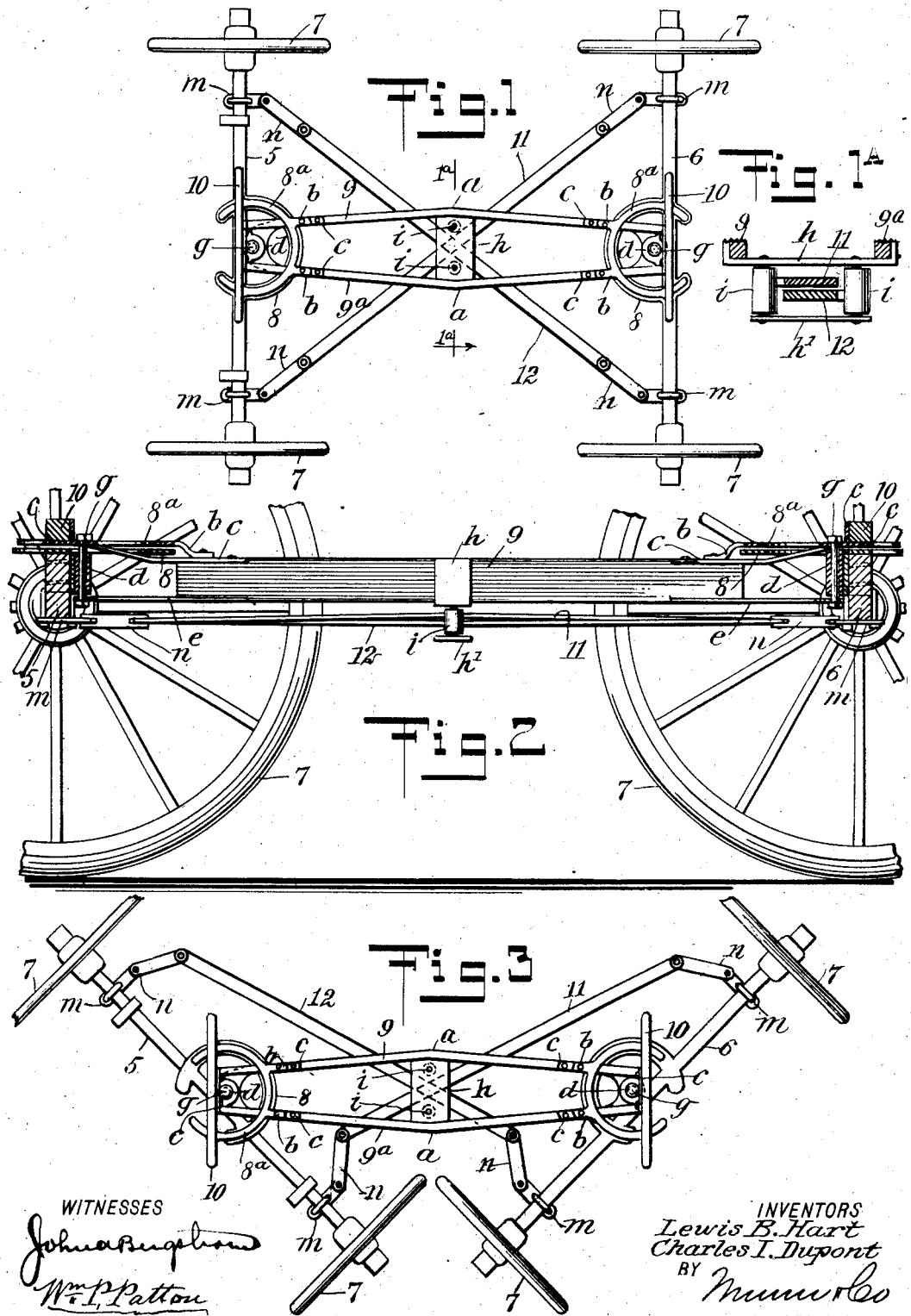
WITNESSES
INVENTORS
Lewis B. Hart
Charles I. Dupont
BY
ATTORNEYS

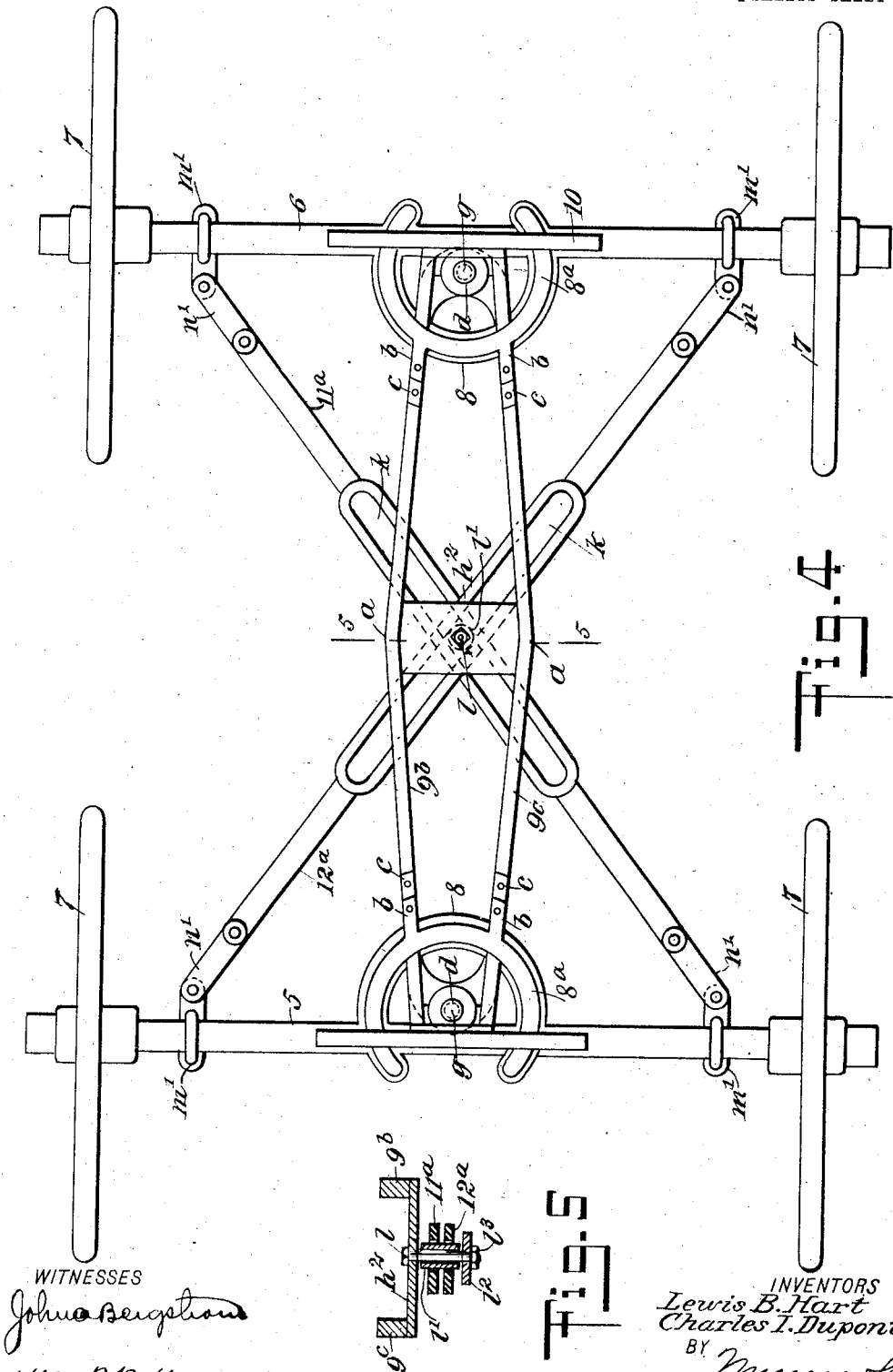

UNITED STATES PATENT OFFICE.

LEWIS BENJAMIN HART AND CHARLES INNOCENT DUPONT, OF PLAQUEMINE, LOUISIANA.

VEHICLE RUNNING-GEAR.

No. 894,000.  Specification of Letters Patent.  Patented July 21, 1908.

Application filed October 10, 1907. Serial No. 396,747.

*To all whom it may concern:*

Be it known that we, LEWIS BENJAMIN HART and CHARLES INNOCENT DUPONT, both citizens of the United States, and residents of Plaquemine, in the parish of Iberville and State of Louisiana, have invented new and useful Improvements in Vehicle Running-Gears, of which the following is a full, clear, and exact description.

The purpose of the invention is to provide novel, simple details of construction for the running gear of wheeled vehicles, which will adapt the vehicle to be turned in an arc or circle of very short radius, in a perfectly safe manner, and avoid excessive friction between working parts of the running gear.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a plan view of the running gear of a vehicle, embodying features of the invention, showing the details as they are relatively adjusted when the vehicle is drawn in a straight line; Fig. $1^a$ is a transverse sectional view substantially on the line $1^a$—$1^a$ in Fig. 1; Fig. 2 is an enlarged longitudinal sectional view of novel details, mounted on wheels shown in part; Fig. 3 is a plan view of the improved running gear, showing the relative positions of the parts thereof, when the vehicle is turned in a circle of small diameter; Fig. 4 is an enlarged plan view of the running gear, showing a modified construction thereof; and Fig. 5 is a transverse sectional view, substantially on the line 5—5 of Fig. 4.

In the drawings illustrating the construction and application of the details of the invention, 5, 6, respectively indicate the front and rear axles of a vehicle, on the spindle ends of which axles are rotatably mounted traction wheels 7, that are preferably of an equal diameter. Centrally upon the upper side of each axle 5, 6, a fifth wheel of novel construction is mounted, each comprising two half-sections 8, $8^a$. A fixed segmental ring 8, that is the lower half-section of each fifth wheel, is secured firmly upon the upper face of the engaged axle, and thence extends rearward or forward therefrom, as the case may be, it being understood that the fifth wheel section 8, on the front axle 5 projects from the rear edge of said axle, and the like section on the rear axle 6 projects forwardly therefrom, as is clearly shown in Fig. 2. Two similar reach bar members 9, $9^a$, are employed, which may with advantage be bent centrally and outwardly, as indicated at $a$, $a$ in Figs. 1 and 3, and together constitute a two-part reach bar.

A bolster 10 is loosely mounted over each axle 5, 6 by means of the upper section $8^a$ of each fifth wheel, these fifth wheel sections respectively having a loose-seated engagement with the upper side of a corresponding fixed fifth wheel section 8.

Preferably each fifth wheel section $8^a$ is provided with two spaced lugs $b$, $b$, which are seated upon and secured to adjacent ends of the reach bar members 9, $9^a$.

There are two stay bars $c$, $c$, secured by similar ends upon the upper sides of respective reach bar members 9, $9^a$, at or near their opposite ends, the remaining ends of the stay bars being affixed upon the adjacent sides of the respective bolsters 10, said stay bars serving to reinforce and greatly strengthen the attachment between the reach bars and the bolsters.

Between the stay bars $c$, $c$ and upon the inner vertical sides of the axles 5 and 6, or in other words at the longitudinal centers of said axles, the similar bracket boxes $d$, $d$ are rigidly secured by bolts or rivets, as indicated in Fig. 2, said boxes having vertical bores.

A joint leaf $e$, preferably in the form of a furcated bar, is secured at the ends of its forked limbs upon the lower surface of each of the twin reach bar members 9, $9^a$, at their respective ends, these forked joint leaves at their outer ends seating upon the lower ends of the bracket boxes $d$, $d$, said outer ends each having a vertical perforation therein opposite the bore of a respective box, as shown in Fig. 2.

The boxes $d$, $d$, are pivoted upon the joint leaves $e$, $e$, respectively, by headed bolts $g$, $g$, that pass through the alined bores in the boxes and leaves, and are loosely secured in place by nuts on their threaded ends.

It will be seen that by the described construction and combination of parts, either axle 5, 6, may be swung on its pivot center bolt $g$, and the wheels 7 be turned angularly toward the center of the running gear so that their peripheral edges will approach the reach bar members 9, $9^a$, as indicated in Fig. 3.

In order to adapt the lateral turning movement of the front axle 5, to transmit a lateral or swinging movement to the rear axle 6, in an opposite direction, so as to cause corresponding ends of the axles and wheels thereon to approach each other, and thus adapt the vehicle to be given a quick turning movement, two similar coupling bars are provided, which will be now described.

The coupling bars, when constructed as shown at 11 and 12 in Figs. 1 and 3, consist of flat metal bars that have their edges parallel with each other, and are of an equal length, and when arranged for service the bars 11, 12 are disposed in X-form, crossing below the two-part reach bars 9, 9ª.

Upon the axles 5, 6, near their spindle ends, clip bands $m$ are secured thereon, and between said clip bands and the ends of the coupling bars 11, 12, short link plates $n$ are introduced, having their ends jointed upon the said coupling bars and upon the clip bands, as is shown in the drawings.

The similar coupling bars 11, 12, are so proportioned in length, that the link plates $n$ on each axle will be disposed parallel with each other when the axles and bolsters thereon are held by said coupling bars in parallel planes, as shown in Fig. 1.

There is a yoke plate $h$, secured by its ends transversely on the reach bars 9, 9ª, at their longitudinal centers, the coupling bars 11, 12 crossing directly below said yoke plate, and on said plate two rollers $i$, $i$, are pivoted, and are oppositely disposed in the exterior angles formed by the crossing of the coupling bars, a portion $h'$ of the yoke plate extending below the rollers $i$ for the support of their lower ends, as shown in Figs. 2 and 4.

It will be evident that upon giving a lateral turning movement to the front axle 5, by means of draft power such as an animal hitched thereto, the turning of said axle in either direction, will be transmitted to the rear axle through the coupling bars 11, 12, and said axles will have their corresponding ends and wheels 7 thereon, moved toward each other as shown in Fig. 3, and thus upon continuing the lateral movement of the front axle, the vehicle running-gear may be caused to traverse a small circle or arc of the same, as occasion may require. A particularly advantageous feature of this disposition of the antifriction rollers $i$, $i$, is secured, in that the crossed coupling bars always have contact with each other on a straight line drawn between the pivot bolts $g$, $g$, that represent the longitudinal centers of the vehicle axles 5, 6, which will insure the proper tracking of the wheels 7 that are turned toward each other, so that they will travel in a complete circle of the smallest diameter possible.

In Figs. 4 and 5, a somewhat different construction of the coupling bars is shown, said bars 11ª, 12ª having elongated slots $k$ formed therein. A yoke plate $h^2$ is secured upon the link bars 9ᵇ, 9ᶜ, that are similar to the link bars 9, 9ª, said yoke plate being likewise positioned at the centers of the link bars; and as shown in Fig. 4, the coupling bars cross each other below the yoke plate.

The coupling bars 11ª, 12ª, are of an equal length, and at their ends are pivoted upon the adjacent ends of short link plates $n'$ which, at their remaining ends, are pivoted upon clip bands $m'$ secured upon the vehicle axles 5, 6 and as shown the coupling bars cross each other at their centers, when the link plates $n'$ are in pairs disposed parallel with each other.

A coupling bolt $l$, is passed down through and closely fits in a perforation formed centrally in the yoke plate $h^2$ and thence through a roller sleeve $l'$, which loosely occupies the slots in the coupling bars 11ª, 12ª where they cross each other.

The coupling bolt $l$ projects below the coupling bars and is held in place by a washer $l^2$ and a nut $l^3$, the latter being screwed upon the threaded lower end of said bolt.

It will be seen that in operation, the invention as illustrated in Figs. 4 and 5, operates similarly to that represented in the preceding figures, enabling the running gear to be turned to either side, so that the wheels, thrown toward each other, will track in a true circle of small diameter; and furthermore, the slotted coupling bars 11ª, 12ª will, while turning operation is in progress, cross at the center of the yoke plate $h^2$.

Owing to the special construction of the running gear as described, great strength and durability is afforded, together with lightness of parts and a neat graceful design; the coaction of details being such, that but slight friction results from the rapid motion had by the improved gear; and it will be seen that in each example of our invention, the vehicle may be turned in either direction with ease and perfect safety.

Having thus described our invention, we claim as new and desire to secure by Letters Patent:

1. The combination with two axles, a fifth wheel on each axle, and a reach formed of two spaced bars connected at their ends with the fifth wheels, of a yoke plate connecting said reach bar members at their centers, two crossed coupling bars jointed at their ends to links on the axles, and rollers carried by the yoke plate and bearing upon the coupling bars where they cross each other at the center of the yoke plate.

2. The combination with two axles, a fifth wheel on each axle, a reach formed of two spaced bars connected at their ends with the fifth wheels, and a yoke plate secured on the reach bar members at their centers, of two slotted coupling bars, links adapted for connecting the ends of said coupling bars with the axles, and a roller mounted upon a bolt depending from the yoke plate and occupying the slotted links where they cross each other.

3. The combination with two axles, a fifth wheel located centrally on each axle, a bolster mounted on the movable upper section of each fifth wheel, a two-part reach, a central transverse yoke plate on the two sections of the reach, means for rigidly connecting the ends of the reach with the bolster, and means for loosely securing the ends of the reach upon the respective axles, of two similar coupling bars, clip bands on the axles near their ends, links pivotally connected to the clip bands and to the ends of the coupling bars, and anti-friction rollers carried by the yoke plate, which contact with the reach bars where they cross each other.

4. The combination with two axles, a fifth wheel located centrally on each axle, a bolster mounted and secured on the movable upper section of each fifth wheel, a two-part reach, means for rigidly connecting the ends of the reach with the bolster and with the upper section of each fifth wheel, and means for pivoting the ends of the reach upon the respective axles, of two crossed and longitudinally slotted coupling bars, an anti-friction pivot bolt loosely connecting the coupling bars where they cross, clip bands on the axles near their ends, and links pivotally connected to the clip bands and to the ends of the coupling bars.

5. The combination of two axles, a fifth wheel on each axle, the upper section of each wheel being provided with a pair of lugs, a bolster carried by the upper section of each fifth wheel, a reach formed of two spaced bars and having their ends secured to the lugs of the fifth wheel section, stay bars secured to the ends of the reach bars and to the bolsters, and forked bars secured to the reach bars and pivoted to the axles.

6. The combination of two axles, a fifth wheel on each axle, a bolster carried by the upper section of each fifth wheel, a reach formed of two spaced bars and having their ends secured to the upper sections of the fifth wheels, stay bars secured to the upper side of the reach bars and to the bolsters, forked bars secured to the under side of the reach bars, boxes secured to the inner faces of the axles, and bolts passing through the boxes and the forked bars.

7. The combination of two axles, a fifth wheel on each axle, a reach formed of two spaced bars and having their ends secured to the upper section of the fifth wheels and pivotally connected to the axles, spaced rollers carried by the reach bars, two crossed coupling bars passing between the spaced rollers, and links pivotally connecting the ends of the bars with the axles.

In testimony whereof we have signed our names to this specification in the presence of two subscribing witnesses.

LEWIS BENJAMIN HART.
CHARLES INNOCENT DUPONT.

Witnesses:
T. E. W. GRASS,
JAS. M. RHORER, Jr.